Nov. 3, 1931.　　　　W. S. MASON　　　　1,830,518
BUILDING WITH FACILITIES FOR AUTOMOBILE PARKING AND TRANSPORTATION
Filed Nov. 3, 1930　　　7 Sheets-Sheet 1

Nov. 3, 1931.   W. S. MASON   1,830,518
BUILDING WITH FACILITIES FOR AUTOMOBILE PARKING AND TRANSPORTATION
Filed Nov. 3, 1930   7 Sheets-Sheet 4

Inventor
William S. Mason
By Wooster & Davis
Attorneys

Nov. 3, 1931.  W. S. MASON  1,830,518
BUILDING WITH FACILITIES FOR AUTOMOBILE PARKING AND TRANSPORTATION
Filed Nov. 3, 1930   7 Sheets-Sheet 7

Fig. 15.

Inventor
William S. Mason
By Wooster & Davis
Attorneys.

Patented Nov. 3, 1931

1,830,518

UNITED STATES PATENT OFFICE

WILLIAM S. MASON, OF BRIDGEPORT, CONNECTICUT

BUILDING WITH FACILITIES FOR AUTOMOBILE PARKING AND TRANSPORTATION

Application filed November 3, 1930. Serial No. 493,027.

This invention relates to a building with particular reference to automobile parking and its relation to business activities such as are carried on in stores, offices and so forth.

It is common knowledge that the parking of automobiles in our towns and cities is a serious problem. The use of the automobile today by shoppers, business and professional men is indispensable both for transportation and as a time saver, but it ceases to become a time saver when a man has to park his car several blocks from his place of business. These conditions instead of improving are steadily becoming worse as the number of cars and drivers are steadily increasing year after year, and the streets of down town sections are very small and can be very little changed without immense expense, and even then there could not be provided sufficient parking space so that every one could park his car within a short distance of his place of business.

Also, the automobile has increased the trading radius of our merchandising centers to from five to six miles in the trolley age to from fifteen to twenty-five miles at the present time, and with wide, highspeed roadways will tend to extend this radius considerably farther beyond these figures. Under these conditions, the great number of automobiles in the cities has made it necessary for the authorities to provide strict parking restrictions with respect to the time when an automobile may remain parked in any given place. This limits greatly the use of the automobile and makes it absolutely necessary that additional parking spaces be provided where the cars may remain parked unrestricted until such time as their owners' business mission has been satisfactorily completed. These parking spaces must be adjacent to or not far removed from the location where the business is being transacted.

Central vacant properties which are awaiting proper development are now being converted into paid parking spaces and partially overcome the difficulty. The fees in these parking spaces vary according to what the particular location warrants and what the traffic will bear. These parking spaces will, however, become fewer and fewer as these vacant properties are developed for a higher utility and a greater return on the investment.

Relief has been attempted by building of automobile hotels and garages erected in some sections somewhat off the real business center on land that will provide adequate return on the land and building, but they do not meet the real need for the shopper and the business man who may find it necessary to come into this section and leave it several times a day. There is a regular formality to go through each time it is necessary to do this, to say nothing of the repeated expense of this procedure such as driving to this garage, leaving the car, which may have to be driven to one of the several floors, leaving the building and walking to his destination, transacting his business and then repeating the process to get his car back on the street again. Then too, if this garage is located several blocks away from his business, there is a great deal of time and energy consumed in going both ways.

Decentralization of business has been offered as a solution of this parking problem, but the ill effects of this decentralization are more costly to general business then the conditions to be relieved. Highly centralized sections are necessary for certain lines of business, particularly where large stocks of merchandise are carried which necessitate a large variety of sizes, colors and styles. When these stock conditions exist it is absolutely necessary that quick turn overs be made or the stock becomes obsolete. In some lines, stocks are turned over daily, weekly and monthly. This would not be possible if the center business section were spread out thin all over the community. The staples such as food products are not affected by style or sizes, but are affected by perishability and must be sold in a district commanding a large traffic count. Still further, decentralization of business tends to decrease land and building values and also increases business building overhead.

The average automobile parked parallel to the curb occupies a space from fifteen to thirty feet long depending on the size of the automobile and the space left between the cars. The average width of mercantile store is considerably less than twenty feet and, therefore, this amount of curb in front of this store must render parking facilities for not only this store, but also for any additional tenants that may occupy the second and subsequent floors. The average down town parking limit is sixty minutes which, if the parker stays the limit, only gives this parking space a turnover of eight or nine cars a day during the business hours, which is negligible when divided among two, three or four merchants. This parking facility average can furthermore be considerably cut down when such space is from time to time taken up by delivery systems of the merchants or upstairs tenants, and also by the trucking concerns that use it off and on for delivery of merchandise. In some cases it is even necessary on account of inaccessibility to the curb that trucking concerns make deliveries from the center of the street, which considerably hampers the free flow of traffic that normally occupies the middle of the street.

The lack of parking space in the business centers has also materially affected moving traffic by increasing it along our central streets, but this increase is in a great measure due to the cruising of cars around the several streets looking for a parking spa e that someone will vacate just before they get there. This is a great waste of time and fuel, and a superficial survey of these conditions would tend to indicate that wider thoroughfares were needed, while if sufficient parking facilities were available this condition would be remedied and the widening of streets which would be very expensive would not be necessary. Furthermore, while wider streets are very costly they do not increase the curb footage where parking is usually done, but on the other hand tend to decrease it by the intersection of other thoroughfares.

Curb parking has another objection which is very little considered, but is of quite a little importance to merchants and that is, when cars are parked stationary at the curb people of average height can not see the type of stores, class of merchandise or other features of the store on the opposite side of the street with the exception of the overhead s'gn. When this fact is taken into consideration, merchants on each side of the street lose all of the advantages that their store windows may have for display from across the street. While these stores windows may be discernible through moving traffic, they are entirely eliminated in stationary parking.

Still further, an automobile to be properly parked should be on a substantially flat surface. There are large areas of flat surfaces in our central business zones that are not being utilized at all and the greater of these are the flat roofs of the present existing buildings. These roofs are of various heights and are unusable for parking facilities unless they are a large continuous area, and then only by the use of elevators and providing the structure is of sufficient strength to carry these additional loads. Basements are also flat surfaces which as a rule are not used for their fullest utility, but to be practical for parking purposes they would have to be of sufficient height and practically free of piers or posts.

It will be apparent from the above that the parking problem is a serious one and that neither vacant central property parking spaces, central garages, decentralization of business or widening of streets is a satisfactory solution.

It is, therefore, an object of the present invention to overcome to a large extent these objections, and has for a particular object to provide a building which will provide ample store, office and similar space with ample parking space closely adjacent thereto and easily and quickly accessible, and which in fact satisfies all the above mentioned demands of the central business zone with regards to the parking problem.

Another object of the invention is to provide extensive parking facilities for automobiles off of the public streets and at the same time losing none of the advantages of direct contact with the mercantile establishments and offices.

Another object of the invention is to so construct the building as to enable cars to proceed under their own power anywhere in the interior of the building for the purpose of parking and to return to the street in a like manner, and also to enable cars to enter and retire from the building at will or to remain parked as long as necessary without being subject to parking restrictions.

Still another object of this invention is to provide a building structure which enables the use of the roofs of the structure for a utility that has not heretofore been available and that is for a roadway that is continuous from one building to another and in which these roadways may be extended to and from innumerable building units which may be added from time to time, and at the same time these roadways may be used for parking spaces.

Still another object is to provide a building which will enable the exhaust noises and gases to be freely dissipated into the air and will effect their elimination as all of the roadways and parking spaces are freely open to the air and enjoy all of the advantages now enjoyed on public thoroughfares now known as streets.

Still further objects are to provide a building which will provide parking space for a large number of automobiles to thereby bring about relief from the public highway parking problem, and to produce a structure for buildings in central zones which will enable municipalities to abandon the necessity of widening the streets to relieve traffic congestion brought about by the parking of automobiles along the curbs.

A further object is to provide a building structure for these purposes which is not limited by the shape or area of the land available, but may be round, square, triangular, oblong or irregular and any or all of these shapes may be added to like or unlike shapes without losing any of its advantages, or which may be built around an area that can not be built on or over.

Still another object is to provide a building which will enable fire fighting apparatus to proceed directly to the point of the fire and fight the same from two sides unobstructed on the upper levels as well as on the lower levels, and it will be possible to take the apparatus directly to the level of the fire with the consequent greater degree of safety from the fire hazard in congested areas.

With the foregoing and other objects in view the invention consists in the novel arrangement of a building structure as will be more fully disclosed in connection with the accompanying drawings in which various building arrangements are illustrated to disclose the principles of the invention and to show how it may be used for practically any conditions, shape or location of property available to secure the maximum advantages and utility, particularly with relation to the parking problem for automobiles with respect to mercantile business and office location.

Referring first to Figs. 1 to 8 inclusive I have shown in these figures a building having the objects above noted comprising two units placed on two rectangular city blocks separated by a public street, these figures showing not only the arrangement of the elements of the individual units, but also how they can be connected to provide a unitary arrangement with maximum utility of the space and the ventilating facilities available. The arrangement illustrated comprises a unit built on each block and although the units are connected over the intervening street still they are distinct and separate units and if only one city block is available, a single unit may be built thereon to secure the advantages enumerated. As illustrated each unit comprises a plurality of separate floors or stories, the units illustrated comprising three stories or floors with a basement floor or level below the ground or street floor level, and a roof over the upper floor or story for automobile parking facilities in addition to those provided at the various floor levels. It is, however, to be distinctly understood that the arrangement and location of the various ramps leading to the different levels, the various arcades and other entrances to the buildings can be varied according to circumstances. Thus, for instance on the ground floor corresponding to the street level, the street level outside the building being indicated at 16 with the usual sidewalk 17, may be offices or stores 18 of various sizes. And on the same level running along outside of the inner wall 19 is an automobile roadway and parking space 20 with a sidewalk 21 between it and the wall 19. On the next floor above or second story may be offices or stores 22 between the inner wall 23 and the outer wall 24, and on the level of this floor is another automobile roadway and parking space 25 with a sidewalk 26 between it and the inner wall 23. Similarly, on the third floor may be offices or stores 27 between the inner wall 28 and the outer wall 24, and on the level of this floor an automobile roadway and parking space 29 with a sidewalk 30 between it and the inner wall 28. On the roof of the top story 27 is an automobile roadway and parking space 31 which may be provided with a sidewalk 32 around one side.

Figure 1:
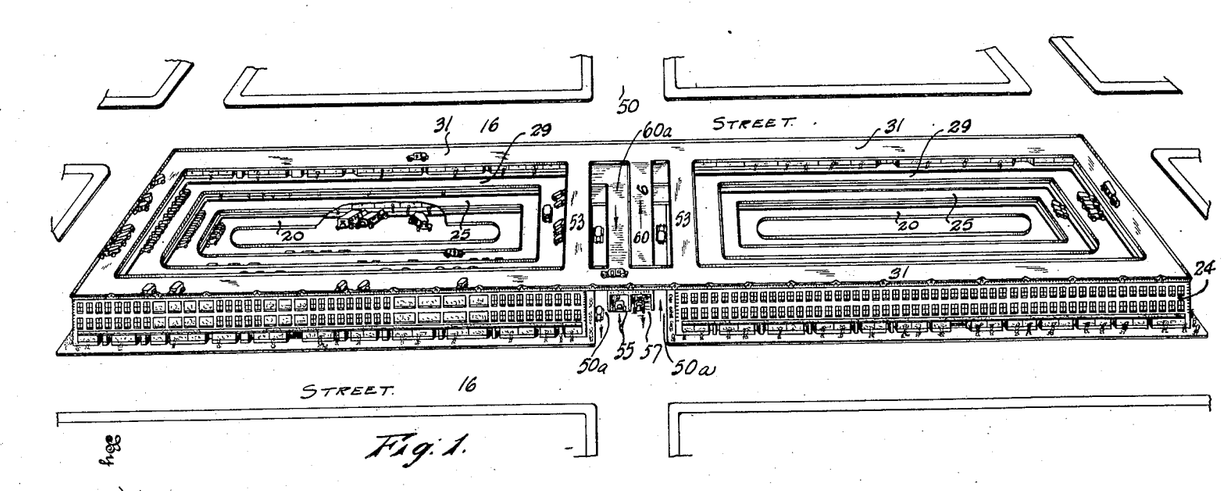
Fig. 1 is a perspective view looking downwardly onto a building constructed according to my invention, this being a comparatively simple arrangement involving two building units placed on two rectangular city blocks separated by an intervening street.
Figure 2:
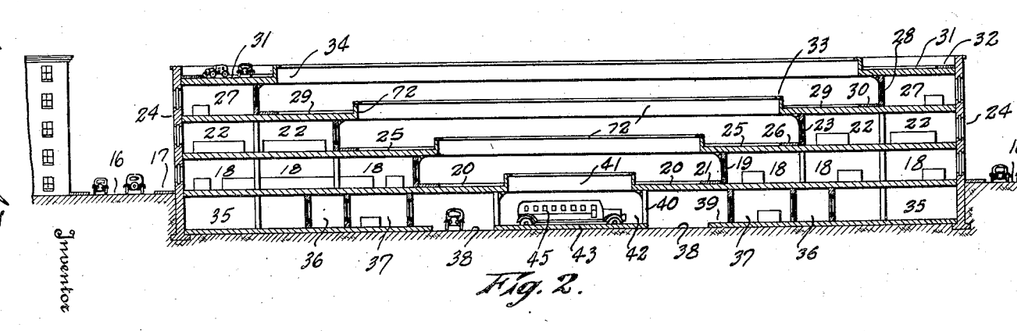
Fig. 2 is a transverse vertical section through one of the units of Fig. 1.
Figure 3:
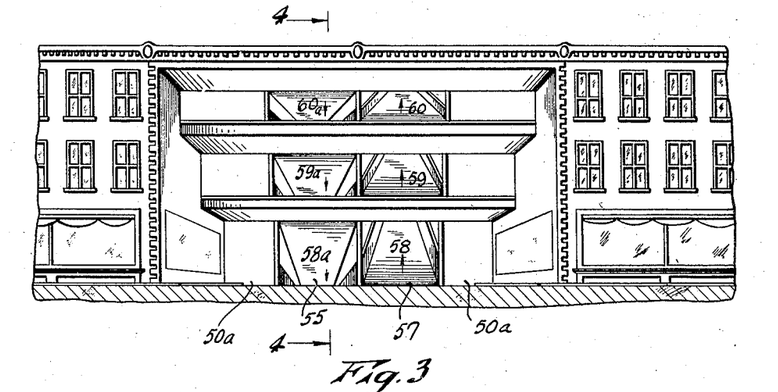
Fig. 3 is a front view showing in perspective an arrangement of the inclined ramps leading to the various floor levels from the intervening street.
Figure 4:
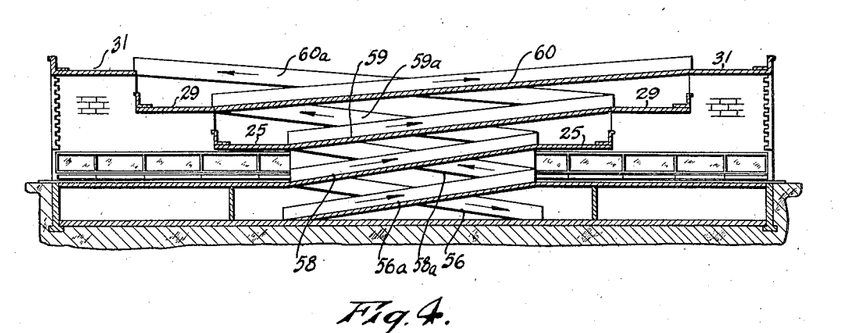
Fig. 4 is a transverse vertical section substantially on line 4—4 of Fig. 3.

It will be noted from this arrangement that the various floors or stories, although superposed, are arranged in stepped or terraced relation, the lowest or ground floor being the widest and the top floor the narrowest with the second floor intermediate the two. It is also to be noted that in each instance the automobile roadway and parking space forms part of the roof of the floor next below so that these roadways and parking spaces are all open above to the outside air so as to provide complete and perfect ventilation and escape for the exhaust and other gases. It also permits access of light and air to the inner walls 19, 23 and 28 the same as to the outer wall 24 so that in each store and office there is cross ventilation and entrance of light from both front and rear. Furthermore, it will be evident that there is extensive parking space for automobiles on each floor level with an additional extensive parking space on the roof, which are all easily accessible. It is preferred to extend the roadways inwardly over the inner walls 19, 23 and 28 so that they overhang these walls as indicated at 33. This overhang or construction permits the use of the proper width roadway for both parking of cars and passage of cars behind the parked cars and furthermore, it forms a canopy or shelter over the sidewalks 21, 26 and 30 on the next lower levels to protect them from the weather. Suitable walls 34 are built around the inner edges of the roadways and serve as protection to prevent running off the roadways.

Figure 5:
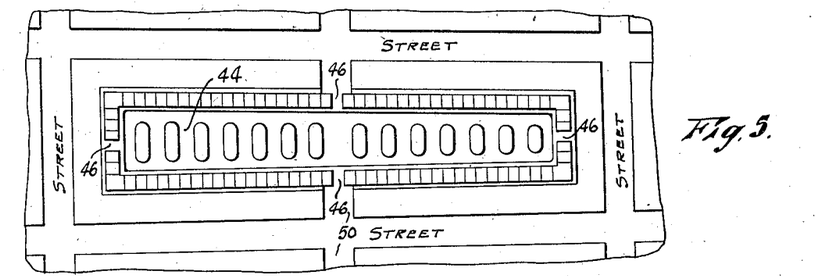
Fig. 5 is a diagrammatical plan of the basement level of this building arrangement of Fig. 1.

On the basement level the arrangement may be similar to those on the floors described or, of course, it may be arranged differently depending on the uses to which it is to be put and on the space available. In the buildings shown in Figs. 2 and 5, there is shown storage for stores at 35 with a passageway 36 between this storage and a series of small stores 37. There may be a roadway and parking space as shown at 38 with a sidewalk 39 between it and the inner wall of the stores 37. The supports 40 are merely supporting columns so that the space above 38 is open to the air through the central open space 41 for escape of gases and products of combustion. For a somewhat wider lot the space over 38 may be enclosed and the roadways 38 directly under the open top 41 similar to the roadways 20, 25 and 29. If the building shown is used with a somewhat narrower lot, the arrangement may be easily varied to accommodate the building for the space available. In Figs. 2 and 5, central space 42 is shown as arranged for a bus terminal, but of course, if it is not desirable to use it for this purpose, it can be used as parking space and roadway as a substitute for the roadways and parking spaces 38, and then the spaces over 38 could be enclosed for stores or other uses. As shown for use for bus terminals or taxi stands, there may be provided a series of safety platforms 43 with spaces 44 between them for parking of busses 45 to facilitate discharge and taking on of passengers. Of course if desired any of the store spaces as 46 in Fig. 5 may be arranged as arcades to provide access from the space 48 to the sidewalks 39 through the passage 36 without going through any of the stores.

Figure 6:
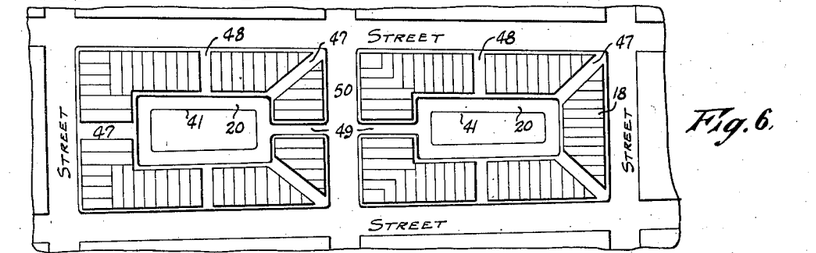
Fig. 6 shows the arrangement of the street level.

On the ground floor an arrangement similar to that shown in Fig. 6 may be used, but it will be understood that each of the arrangements shown in Figs. 5 to 8 are merely illustrative and to show how the space available may be used, but of course, the arrangements may be varied as desired depending on the size of the area available, its shape and its relation to the streets and other units of this building. In Fig. 6 the ground floor is arranged with a series of stores 18 which have entrances both through the outer wall 24 and inner wall 19 and permit access from all sides from the various streets. There may be arcades 47 and 48 running from the outer wall and sidewalk 17 to the inner sidewalk 21. The central opening 41 indicates the open space over the parking space in the basement area for free escape of the gases and to insure plenty of light and ventilation. Roadways 49 for automobiles extend from the intermediate street 50 to the roadway and parking space 20 so that any one desiring to use this parking space and visit any of the stores or offices on this level may drive in through 49 and over the roadway 20 to the desired location and park his car in any place vacant.

Figure 7:
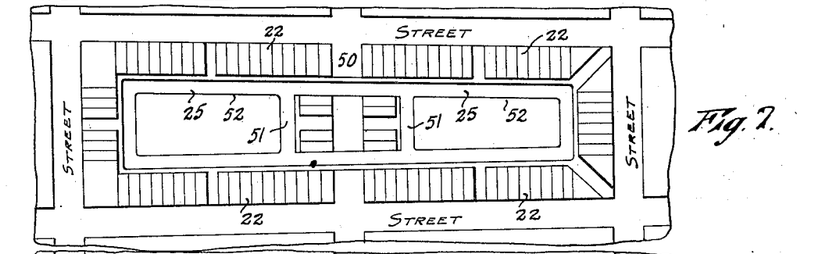
Fig. 7 shows the arrangement of the second floor level.

On the second floor indicated in Fig. 7 practically the same arrangement is shown except that the space for stores and offices is not as wide as on the first floor due to the stepped or terraced construction of the building as will be evident from an inspection of Figs. 1 and 2. The roadways and parking spaces 25 on opposite sides may be connected adjacent the center of the building by means of cross driveways 51 so that the entire parking space is easily available. These roadways surround the central openings 52 for permitting free access of light and air to the floor beneath and free escape of gases.

Figure 8:
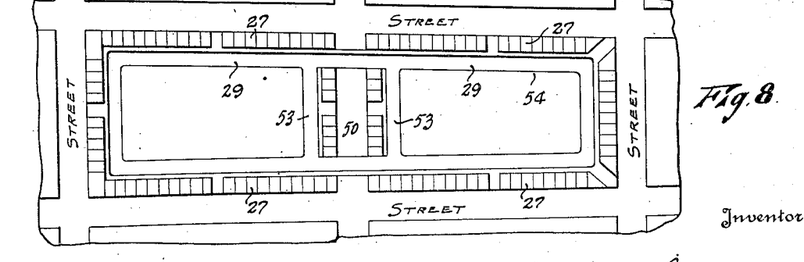
Fig. 8 shows the arrangement of the third floor level.

The third floor as indicated in Fig. 8 may be practically the same except that the floor and office space 27 is still narrower due to the stepped and terraced construction of the building. Here too the roadway and parking spaces 29 may be connected by cross roadways 53. As the store spaces and office spaces are narrower the central open spaces 54 for access of light and air to the floors beneath are still larger. It will be evident from this construction and arrangement that to all floors, with the possible exception of the basement level there is free access of light and air to both the front and rear of the stores and offices, but that even the basement level has plenty of light and ventilation through the central open space. Also that there is parking space entirely off the public streets adjacent each one of these stores and offices and on the level with it, all of which parking spaces are freely open for escape of noises and gases.

Easy access is provided for automobiles to each of the roadways and parking spaces on all levels including the basement and roof by means of inclined ramps or driveways by means of which the cars may proceed to any floor level under their own power without using any elevators or similar devices. These inclined ramps are of sufficient width for easy passage of cars going in opposite directions so that there can be no congestion of traffic. These ramps can be located at any part of the building desired depending on the location of the streets and on any other conditions it may be necessary to take into consideration.

In the illustrated arrangement of Figs. 1 to 8 these ramps are shown as located for access from the intermediate street 50. Thus, as shown there may be two central entrances and exits from the street level 50, the left hand entrance 55 leading by a downwardly inclined roadway or ramp 56 to the basement area and the roadways and parking spaces 38, while the right hand entrance 57 may lead by inclined ramp 58 to the roadway and parking space 25 on the second floor level. Similarly, there may be an inclined ramp 59 leading from the second floor roadway 25 to the third floor roadway 29 and a ramp 60 leading from the third floor roadway 29 to the roof roadway 31, and as shown on the drawings the ramps are located one above the other so that plenty of head room is provided and they require a minimum of space.

It is preferred to arrange the ramps in pairs, that is so that all levels may be accessible from the street level 50 whether the autoist is going in either direction. Thus, although the ramp 56 leads to the basement area from the front of the building, as shown in Fig. 1, there is a similar ramp $56_a$ leading downwardly from the other direction from the same street level to the basement level. This ramp $56_a$ is really under the ramp 58 leading upwardly from the street level and the front side of the building to the second floor level while the ramp 56 is under the upwardly extending ramps $58_a$, $59_a$ and $60_a$ corresponding respectively to the ramps 58, 59 and 60, but inclined in the opposite direction so as to connect the opposite sides of the respective floor levels from those connected by the ramps 58, 59 and 60. In other words, there are two sets of inclined ramps with the individual ramps in each set located one above the other, and all ramps in each set are inclined in the same direction with the ramps of one set inclined in the opposite direction and the ramps of the other set so that all floors are easily accessible from either the floor beneath or the floor above from both sides of the building, so that there may be free flow of traffic at all times and any driver may take his car to any floor level and any parking space easily and quickly at any time under its own power. The passageways $50_a$ on opposite sides of the entrances 55 and 57 are roadways on the street level leading directly through the building so as not to interfere with through traffic on the street 50.

Figure 9:
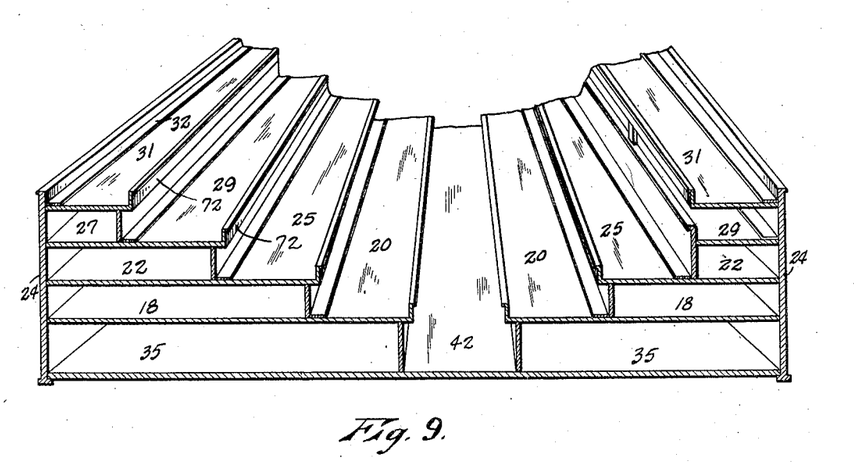
Fig. 9 is a transverse vertical section immediately behind an end wall of the structure showing in perspective a slightly different arrangement of roadways where the width of the land available is not sufficient to permit placing all the wall levels or floors in the stepped or terraced arrangement.

In Figs. 9 to 15 are shown merely by way of illustration different modifications and arrangements which may be used under different conditions of sizes and shapes of property available and different uses. Thus, as illustrated in Fig. 9, if the lot on which the unit is to be built is not of sufficient width to carry the full three story arrangement of Fig. 2, one of the store and office terraces on one side may be omitted and one of the roadways along one side be built directly under the roadway in the next level above. Thus, on the third floor instead of having a store or office space 27 on this side, the roof roadway and parking space 31 is built directly over the roadway and parking space 29. Of course, with this arrangement each of the store and office spaces on this side of the building is shortened by a similar amount.

Figure 10:
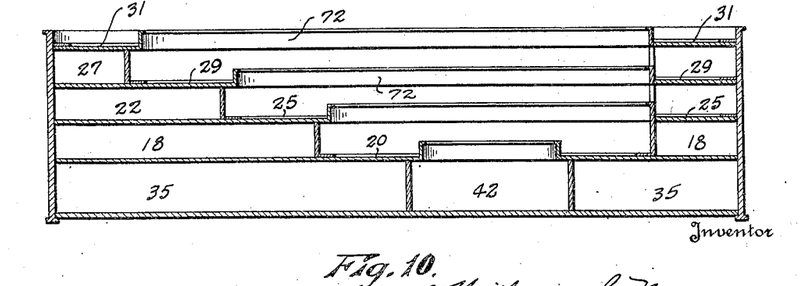
Fig. 10 is a similar view showing an arrangement which may be used for a still narrower plot.

In Fig. 10 is shown how the building can be accommodated to a still narrower lot. The full stepped or terraced effect can be used on the left side of the building, but on the right side there is not sufficient space available for the full width of store and office space so they are eliminated accordingly, and on the second and third floors the roadway and parking spaces only are provided along this side of the building. Thus, the roadway and parking spaces 31 and 29 are both built directly over the roadway and parking space 25 so that even in these narrower lots all parts of the roadways and parking spaces are easily available and may be continuous. Of course, if it is found more desirable to use these spaces for office or store space, this can be done.

Figure 11:
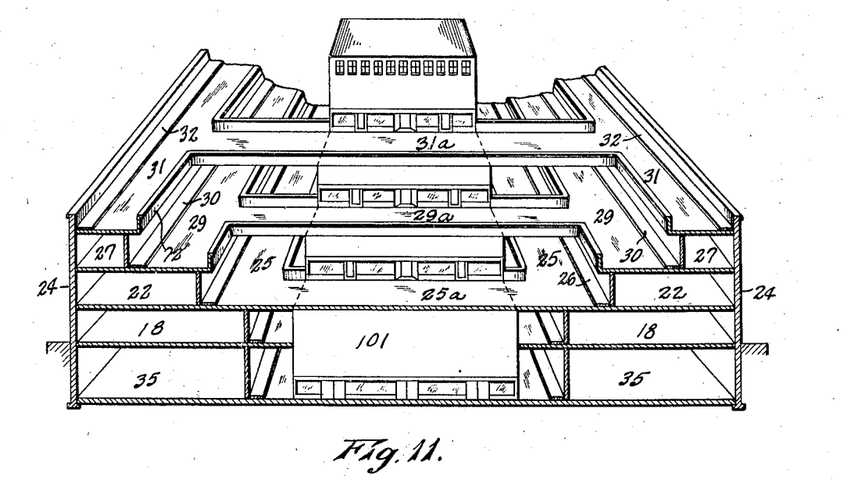
Fig. 11 is a vertical section immediately behind an end wall and showing in perspective how the several roadways may be reversed at the end of a building in the event a large building is necessary inside of the main structure.

In Fig. 11 is shown how this terraced construction of store, office, roadway and parking space may be arranged in the event that a large and high building is necessary inside the main structure and it is desirable this large building be located closely adjacent the street. Thus, at one end of the building arrangement the roadways may be reversed so that they are on the outer side of the building, that is between the building and the end wall 24. The building is indicated at 101 and may be itself terraced at the different levels so it is smaller at these levels. The cross roadways for the various levels pass over these terraces between the building and the outer wall 24 as indicated at $25_a$, $29_a$ and $31_a$. Thus, the first floor of the building comes right out to the street and can display windows and entrances directly on the street 16 or what ever street happens to be on the side of the unit on which this building is built.

Figure 12:
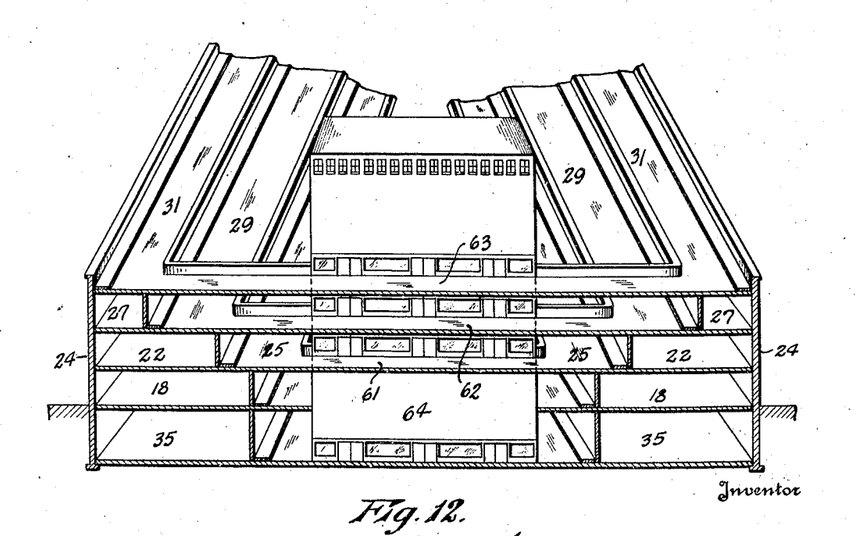
Fig. 12 is a similar view showing another arrangement whereby provision can be made for this large structure inside of the main structure by bringing the roadways out to the end of the building.

In Fig. 12 is shown another arrangement for accommodating a large building such as a theatre within the main structure. In this arrangement the large building is not terraced and the cross roadways 61, 62 and 63 are arranged closely adjacent the end wall 24 of the main building and are arranged one above the other until they return to the terrace plan on the opposite sides where they run into the various roadways and parking spaces on the different levels. This permits the placing of the large building 64 not farther from the sidewalk than the width of the roadways and the ground floor may be built right out to the sidewalk and the street level, it being understood that the section of the figure is taken immediately back of the outer end wall.

Figure 13:
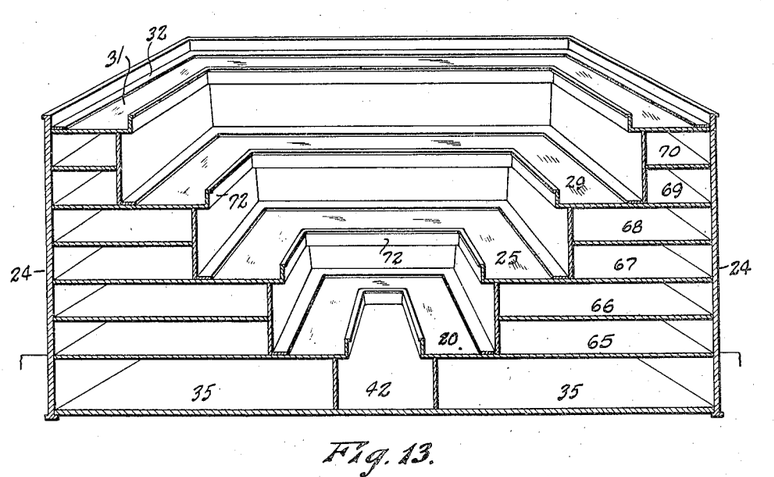
Fig. 13 is a transverse section showing how the structure would appear if the different road levels were built two stories apart instead of one.

In Fig. 13 is shown how a six-story structure may be placed on the same size lot as the three-story structure of Figs. 1 and 2. This is accomplished by building the various roadway and parking levels two stories apart instead of one. That is, between the roadway levels 20, 25, 29 and 31 there are two floors or stories 65, 66, 67, 68, 69 and 70 respectively instead of one as in Fig. 2. Between each pair of road levels the two office and store spaces such as 65 and 66 could be of the same width, the basement area could be arranged the same as in Fig. 2.

Figure 14:
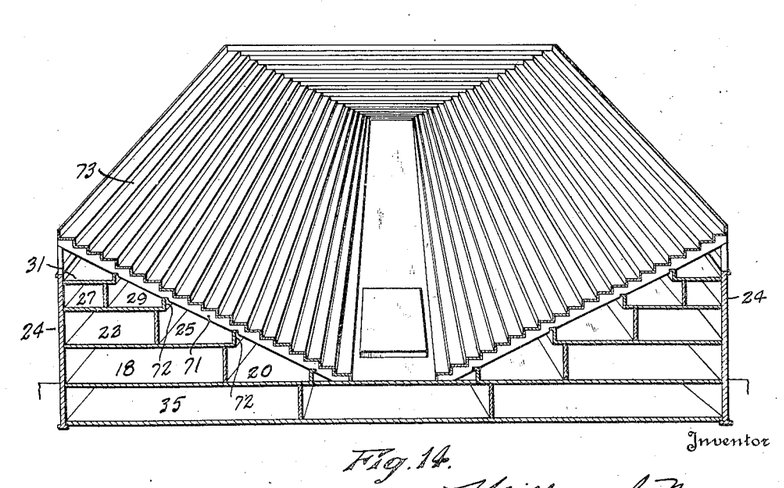
Fig. 14 is a transverse vertical section indicating diagrammatically how the construction may be used for temporarily supporting seats to convert the central space into a large amphitheatre for special purposes.

In Fig. 14 is shown how this building can be used as a support for temporary seats to form an amphitheatre for games, theatrical or other purposes. With this arrangement any suitable number of supporting joists 71 may be mounted on the inner wall 72 of the various floor levels and the seats 73 mounted thereon.

Figure 15:
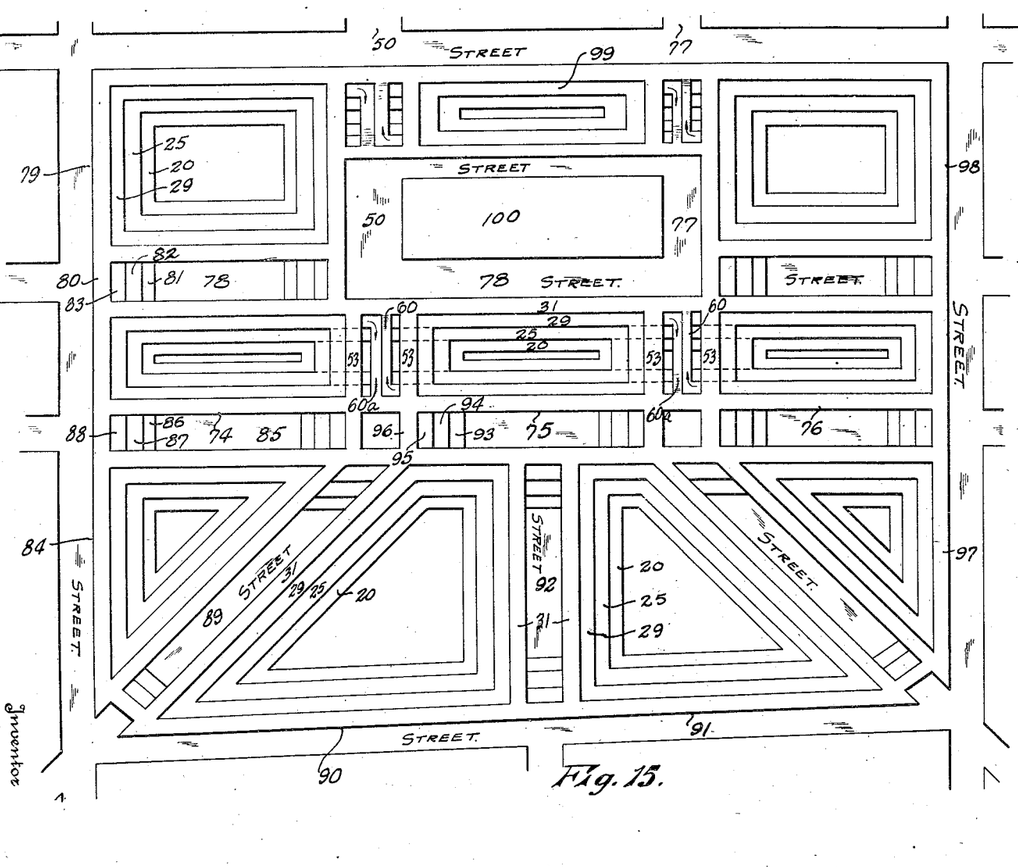
Fig. 15 is a plan view showing diagrammatically how this building arrangement can be used in connection with various shapes of street layouts and indicating how the various building units can be connected with each other regardless of size, shape or manner of street intersection.

In Fig. 15 is shown diagrammatically how this design can be used in different and various arrangements and shapes, and with different street layouts providing different sizes and shapes of lots on which the building may be constructed, and showing the manner in which the different units may be connected regardless of different shapes of lots and different arrangements of the intersecting streets. Thus, in this figure, there is shown at 74 and 75 the two units illustrated in Fig. 1, the intermediate cross street being indicated at 50. Another unit 76, similar in size and shape may be built onto one outer end of unit 75 and connected in the same manner as the two units 74 and 75 are connected, with the various entrance ramps located over the street 77. On the square block above the unit 74 and across the street 78 may be erected a unit 79 constructed in the same manner as the units of Fig. 1 or the other arrangements illustrated to correspond with the shape of the lot, and each of the roadways and parking spaces at the various levels are connected directly with the same roadway levels in the unit 74. Thus, the roof roadways 31 of unit 79 are connected with similar roadways of unit 74 by the cross roadways 80, and the roadways 20, 25 and 29 of the lower levels of unit 79 are connected with the similar roadways of the unit 74 by the connecting cross roadways 81, 82 and 83 respectively. In the same manner the triangular unit 84 may be built across the street 85 and the various roadways on the different levels connected with the similar roadways in unit 74 in the same manner by the connecting roads 86, 87 and 88. Across the diagonal street 89 may be built the irregular unit 90 and connected to the unit 84 and a similar unit 91 across street 92 in the same manner. These units may also be connected across street 85 through the cross roadways at the various levels indicated at 93, 94, 95 and 96. The same scheme and connecting means may be used for the units 97, 98 and 99. The various inclined ramps for gaining access to the various units and the different road levels of these units may be located in any location found desirable. It will be noted that in this arrangement all the automobile roadways and parking spaces on the various corresponding levels are connected in all the units so that all the roadways on any given level are continuous and accessible from any other unit. The rectangle 100 indicates a building such for example as a City Hall or post office built on the square which is not available for building these commercial units. The units can, however, be built entirely around it and connected with each other leaving this square entirely open. It will be evident that with a few units as indicated in Fig. 15 a large number of mercantile and office establishments can be provided with a large amount of parking space in a small central area, and that each one is easily accessible by any car entirely under its own power.

It will be apparent from the foregoing description, that this building arrangement is adaptable for all kinds of uses, such as mercantile, office, apartments, hotels, department stores, factory and railroad terminal buildings, etc. The arrangement will enable cars to proceed under their own power to a parking point anywhere in the interior of the building for the purpose of parking, and allow their return to the street in a like manner. It provides large parking facilities for automobiles off the public highway and at the same time loses none of the advantages of direct contact with the mercantile establishments. By the arrangement of the several levels in the structure as described there is provided a large amount of parking space within the building which can not be provided on the public streets or highways, and by the design of the entrances and exits and direction of traffic regulation inside of the building, it will be free from confusion and enable cars to flow in and around the several floors of the structure without the necessity of again entering the public street or highway. It will be understood that the roadways, with the possible exception of connecting roadways, will be of sufficient width so that they will be used as parking spaces with plenty of room at the back of the parked cars for passage of vehicles along the roadway. It is, however, intended that these combined roadways and parking spaces shall be one-way roadways, while the inclined ramps leading between the various levels will be two-way roadways. Taxi stands may be provided in the lower levels, such as the basement if desired, and this arrangement will enable both horse-drawn and vehicle trucking concerns plenty of facilities to enter and leave the lower or any other levels in delivering the merchandise to and from the stores and buildings. It will be noted that this construction provides for the use of the roofs as parking spaces which spaces have heretofore been unavailable.

The arrangement will enable the majority of the ground floor stores to have entrances both at the front and rear for both automobile and pedestrian traffic, and similarly show-window space for a display of merchandise can be provided on both sides. These stores will also enjoy light and air from both sides which is also true in the stores and offices on the upper levels. The stores and offices on all the levels will enjoy automobile and pedestrian traffic on each level that they have not heretofore enjoyed. As for the stores on the street level, they can have delivery of their merchandise directly to the basement, storage and without the necessity of having the trucks remain on the street to obstruct traffic. It will be obvious that the units may be built to any height or number of stories desired provided there is sufficient land. In the arrangements where there is a roadway only every two stories instead of one as illustrated in Fig. 13, those stories not having the roadways on the same level do not lose all of the advantages because they are only one floor removed from the actual roadway and the automobile and pedestrian traffic.

A special advantage of this design is that in case of fire in any section or location, the fire fighting apparatus may be taken directly to the place of the fire and the fire may be fought from both the front and the rear. In the case of a general fire, there are plenty of exits for the escape of the occupants.

Having thus set forth the nature of my invention, what I claim is:

1. A building comprising, a plurality of floors one above the other, automobile roadways on levels with the floors and extending along one side of and outside the floor spaces, said roadways being uncovered at the top and the lower one extending outwardly beyond the one above, and inclined ramps extending between the different levels.

2. In a building, a plurality of floors on different levels and of different widths, automobile roadways extending along one side wall and outside the floor spaces, and each roadway forming part of the roof of the floor next beneath it, and inclined ramps extending between the respective levels.

3. In a building, a plurality of superposed floors enclosed to form offices, stores and the like, an automobile roadway and parking space extending longitudinally outside the floor space on the level of each floor, the floors being of different widths so that the roadway for each floor forms part of the roof of the floor beneath, and inclined ramps running to the respective floors.

4. In a building, a plurality of superposed floors enclosed to form offices, stores and the like, an automobile roadway and parking space extending longitudinally outside the floor space on the level of each floor, the floors being of different widths so that the roadway for each floor forms part of the roof of the floor beneath, the roof of the upper floor being also an automobile roadway and parking space, and inclined ramps for automobiles running from the different roadways to the roadway above.

5. In a building, a plurality of floors on different levels and of different widths, automobile roadways and parking spaces extending along one side wall and outside the floor spaces at the different levels, each roadway and parking space forming part of roof of the floor next beneath it, a side walk between each roadway and the inner wall of that level, and said roadway and parking space being extended outwardly from the inner wall of the floor beneath and over the sidewalk for that level.

6. In a building, a plurality of floors arranged one above the other and built around a central open space, automobile roadways extending into said space from the inner walls of the various floors, the building at the various floors being progressively narrower from the lower to the upper with the roadways at the different floors forming part of the roof of the floor beneath.

7. A building comprising a plurality of units, each unit comprising a building including a plurality of floors one above the other built around a central open space with the building floors progressively narrower from the lower to the upper, roadways extending into said space from the inner walls of the building at the various levels with the roadways of a unit continuous with those of the adjacent unit on the same levels, and inclined ramps extending between roadways of adjacent levels.

8. A building comprising a pair of units located on opposite sides of an intermediate cross street, each unit comprising a plurality of superposed floors of different widths built around an open central space with the floors being progressively narrower from the lower to the upper, automobile roadways at the various floor levels and extending inwardly into said space from the inner wall of the building and each forming part of the roof for the floor beneath, the roadways of the units on corresponding levels being connected over the street so as to be continuous, an inclined ramp leading from the street level to the next level, and similar inclined ramps leading between the roadways of the different levels.

9. A building comprising a pair of units located on opposite sides of an intermediate cross street, each unit comprising a plurality of superposed floors of different widths built around an open central space with the floors being progressively narrower from the lower to the upper, automobile roadways at the various floor levels and extending inwardly into said space from the inner wall of the building and each forming part of the roof for the floor beneath, a similar roadway forming the roof of the top floor, the roadways of the units on corresponding levels including the roof being connected over the street so as to be continuous, and inclined ramps running between the roadways of adjacent levels to form communication between them.

10. A building unit comprising a plurality of superposed floors built about an open central space with the lower floor the widest, the upper floor the narrowest and an intermediate floor of a width between the two, automobile roadways at the various floor levels extending into the central space from the inner walls of the various floors, a similar roadway forming the roof of the upper floor, and inclined ramps extending between the roadways of the various levels.

11. A building comprising a plurality of floors one above the other and each having inner and outer walls, automobile roadways on levels with the floors and extending along the outside of the inner walls, said floors being of different widths with the lower wider than those above, and inclined ramps extending between the different levels.

12. A building comprising a plurality of floors one above the other and of different widths, each having inner and outer walls, automobile roadways on levels with the floors and extending along the outside of the inner walls, and each roadway forming part of the roof of the floor next beneath it, and inclined ramps extending between the different levels.

In testimony whereof I affix my signature.

WILLIAM S. MASON.